US010010975B2

(12) United States Patent
Oka

(10) Patent No.: US 10,010,975 B2
(45) Date of Patent: Jul. 3, 2018

(54) NUMERICAL CONTROLLER OF LASER BEAM MACHINE

(71) Applicant: FANUC Corporation, Minamitsuru-gun, Yamanashi (JP)

(72) Inventor: Masaki Oka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 712 days.

(21) Appl. No.: 14/687,997

(22) Filed: Apr. 16, 2015

(65) Prior Publication Data

US 2015/0331409 A1    Nov. 19, 2015

(30) Foreign Application Priority Data

May 14, 2014    (JP) ................................ 2014-100830

(51) Int. Cl.
| | |
|---|---|
| *G06F 19/00* | (2018.01) |
| *B23K 26/08* | (2014.01) |
| *G05B 19/19* | (2006.01) |
| *G05B 19/4155* | (2006.01) |

(52) U.S. Cl.
CPC .............. *B23K 26/08* (2013.01); *G05B 19/19* (2013.01); *G05B 19/4155* (2013.01); *G05B 2219/45154* (2013.01); *G05B 2219/45165* (2013.01)

(58) Field of Classification Search
CPC .... B23K 26/08; G05B 19/4155; G05B 19/19; G05B 2219/45165; G05B 2219/45154
USPC ....................................................... 700/114
See application file for complete search history.

(56) References Cited

U.S. PATENT DOCUMENTS

| | | | | |
|---|---|---|---|---|
| 2002/0179581 | A1* | 12/2002 | Inoue ....................... | C21D 1/09 219/121.73 |
| 2003/0183608 | A1* | 10/2003 | Yamazaki .......... | B23K 26/0853 219/121.83 |
| 2012/0035745 | A1* | 2/2012 | Mori ................... | G05B 19/4163 700/13 |
| 2013/0103183 | A1* | 4/2013 | Mochida ................ | G05B 19/19 700/186 |

FOREIGN PATENT DOCUMENTS

| | | |
|---|---|---|
| CN | 101738980 A | 6/2010 |
| JP | H05-241630 A | 9/1993 |

(Continued)

OTHER PUBLICATIONS

Notification of First Office Action dated Mar. 24, 2017 in Chinese Patent App. No. 2015102458023 (5 pages) with English translation (7 pages).

(Continued)

*Primary Examiner* — Ziaul Karim
(74) *Attorney, Agent, or Firm* — Drinker Biddle & Reath LLP

(57) ABSTRACT

When positioning operation control is carried out from a machining end point to the next machining start point in laser beam machining using gap control of a nozzle, if positioning extends over a plurality of consecutive blocks, instead of allowing a gap control axis to automatically retreat or return by positioning of each block, the movement of the nozzle is controlled such that the gap control axis is allowed to automatically retreat by positioning of the first block and allowed to automatically return by positioning of the last block.

2 Claims, 10 Drawing Sheets

(56) References Cited

FOREIGN PATENT DOCUMENTS

| | | |
|---|---|---|
| JP | H07-182021 A | 7/1995 |
| JP | H10-39917 A | 2/1998 |
| JP | 2002-006918 A | 1/2002 |
| JP | 2004-001067 A | 1/2004 |

OTHER PUBLICATIONS

Notification of Reasons for Refusal dated Oct. 27, 2015 in Japanese Patent Application No. 2014-100830 (3 pages) with an English translation (2 pages).

* cited by examiner

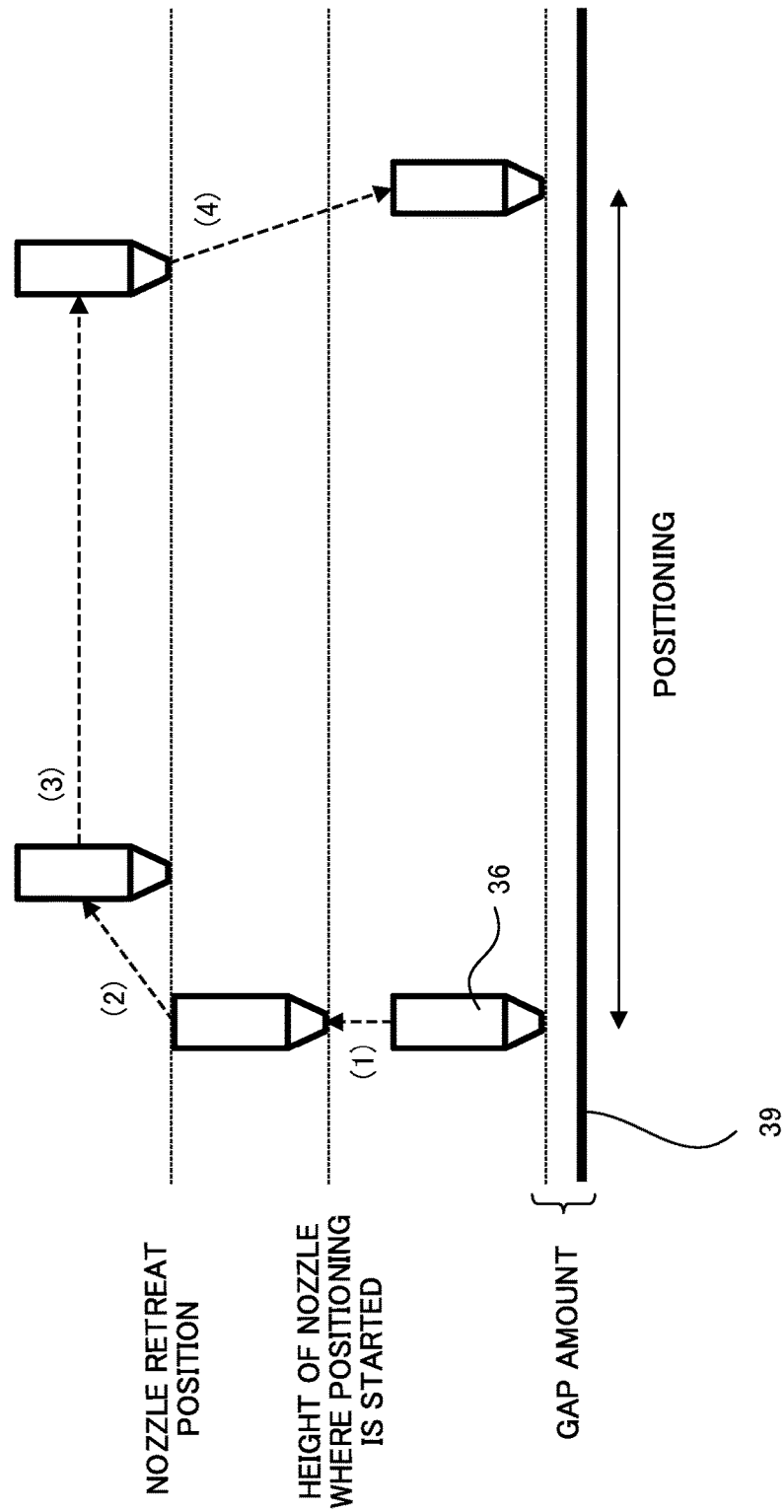

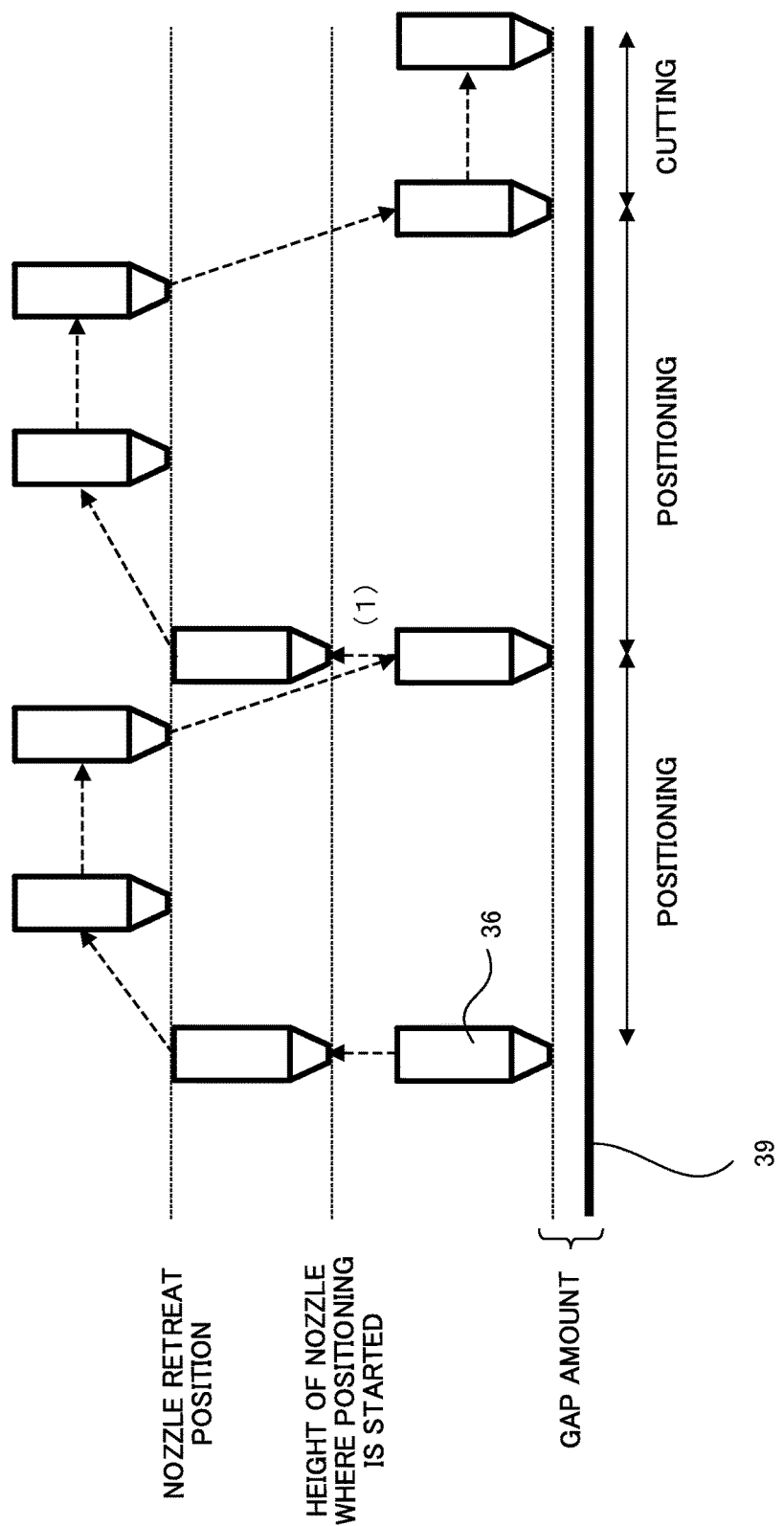

NUMERICAL CONTROLLER OF LASER BEAM MACHINE

RELATED APPLICATION DATA

This application claims priority under 35 U.S.C. § 119 and/or § 365 to Japanese Application No. 2014-100830 filed May 14, 2014, the entire contents is incorporated herein by reference.

BACKGROUND OF THE INVENTION

1. Field of the Invention

The present invention relates to a numerical controller of a laser beam machine having a function of controlling an operation of a nozzle of the laser beam machine to automatically retreat the nozzle from a workpiece surface during gap control of the nozzle or return the nozzle to the workpiece surface.

2. Description of the Related Art

It is necessary for a laser beam machine to hold the physical relationship between a nozzle and a workpiece within a predetermined range and thus, gap control to maintain the distance (gap amount) between the nozzle and the workpiece constant is carried out by controlling the distance between the nozzle and the workpiece.

In laser beam machining in which the gap control is carried out, the workpiece and the nozzle are positioned close to each other and thus, when the nozzle is moved at high speed for positioning with respect to the workpiece, interference with warping or deformation of a workpiece which is generated accompanying the machining or interference with obstacles on the workpiece surface generated accompanying the machining may occur. Thus, after stopping the gap control and issuing a command to cause a gap control axis to retreat in a direction away from the work, it is necessary to carry out positioning and also to activate the gap control when the machining is restarted.

Thus, as disclosed by Japanese Patent Application Laid-open No. 2004-001067 and the like, a method of starting a retreat operation of the gap control axis to a retreat position set simultaneously with the start of positioning, in the positioning during gap control, starting movement of a contouring control axis after the gap control axis retreats to a certain height, and causing the gap control axis to automatically return from the retreat position to the workpiece surface in time with the end of movement of the contouring control axis. With this method, commands to start and stop the gap control and to cause the gap control axis to retreat can be omitted, realizing efficient machining.

The movement of the nozzle according to a conventional technology will be described using FIG. 9.

When a nozzle 36 reaches a machining end point before movement and a positioning command is issued, a numerical controller (1) causes the nozzle 36 to retreat in a direction away from workpiece 39 and (2) starts movement to a contouring control axis when the nozzle 36 reaches a certain height. When the nozzle 36 reaches a retreat position, the numerical controller (3) stops the movement in the retreat direction and continues the movement in the direction toward the contouring control axis. Then, the numerical controller (4) causes the nozzle 36 to return to the surface of the workpiece 39 just when the contouring control axis reaches a positioning end point, and continues machining.

In the positioning operation control of the nozzle according to the conventional technology, obstacles near the nozzle position are avoided when the positioning operation is started by carrying out control such that, after starting the retreat operation of the nozzle, the contouring control axis waits to move for a certain time until the nozzle retreats to a certain height.

However, there are cases in which an obstacle that cannot be avoided even if the nozzle is retreated in a direction away from the workpiece surface between the machining end point and the next machining start point when the nozzle is positioned is present or the nozzle needs to be moved to the next machining start point via a particular position. In such cases, as shown in FIG. 10, the positioning operation needs to be specified in consecutive several blocks separately and if a plurality of consecutive positioning commands as described above is issued in the positioning operation control of the nozzle according to the conventional technology, the retreat/return of the nozzle is repeated for each positioning command block, posing a problem of a long machining time in proportion to the number of positioning commands caused by a waiting time until the movement start of the contouring control axis in a portion of (1) in FIG. 10.

SUMMARY OF THE INVENTION

An object of the present invention is to provide a numerical controller capable of improving machining efficiency by shortening the movement time even if the positioning operation control of the nozzle between the machining end point and the next machining start point is successively carried out in laser beam machining using the gap control.

A numerical controller of a laser beam machine according to the present invention includes a storage unit that stores a machining program, wherein blocks constituting the machining program are sequentially read from the machining program stored in the storage unit, an operation of a nozzle of the laser beam machine is controlled based on a command specified by the read block, and retreat control of the nozzle from a workpiece surface or return control thereof to the workpiece surface is automatically carried out by a positioning command specified by the block during gap control of the nozzle. The numerical controller further includes a look-ahead unit that looks ahead to a next block of the block currently being executed from the machining program during positioning operation control of the nozzle and a positioning movement controlling unit that controls the movement of the nozzle based on a type of the command specified by the next block looked ahead to by the look-ahead unit, wherein the positioning movement controlling unit continues movement control of a contouring control axis while retaining the nozzle in retreat if the next block is the positioning command, and carries out the return control of the nozzle to the workpiece surface if the next block is other than the positioning command.

The positioning movement controlling unit may continue the movement control of the contouring control axis while retaining the nozzle in retreat if the next block is not a positioning command and a command not accompanied by laser beam machining.

The positioning movement controlling unit may carry out the return control of the nozzle to the workpiece surface based on a state of a signal output from a programmable machine controller controlling the laser beam machine regardless of a type of the command specified by the next block.

According to the present invention, a numerical controller capable of improving machining efficiency by shortening the movement time without generating a wasteful waiting time even if the positioning operation control between the machining end point and the next machining start point is successively carried out in laser beam machining using the gap control can be provided.

BRIEF DESCRIPTION OF THE DRAWINGS

The above and other objects and features of the present invention will be apparent from the following description of embodiments with reference to accompanying drawings, in which:

FIG. 9 is a diagram illustrating the movement of the nozzle during positioning operation according to a conventional technology; and FIG. 10 is a diagram illustrating the movement of the nozzle during successive positioning operations according to the conventional technology.

DETAILED DESCRIPTION OF THE PREFERRED EMBODIMENTS

Figure 1:
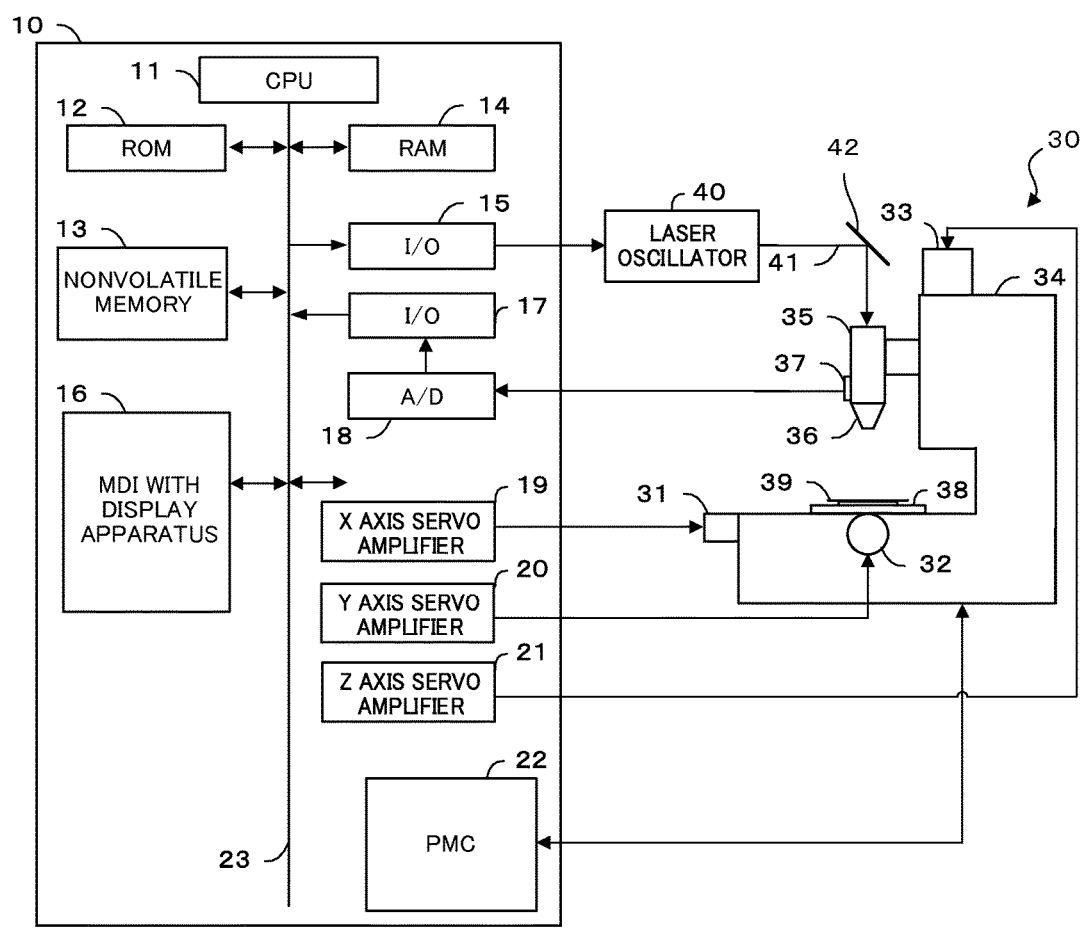
FIG. 1 is a diagram showing a hardware configuration of a numerical controller of a laser beam machine according to the present invention.

FIG. 1 shows a hardware configuration of a numerical controller of a laser beam machine according to the present invention.

A numerical controller 10 controlling a laser beam machine 30 is configured around a processor (CPU) 11 and a ROM 12, a nonvolatile memory 13 configured by a battery backed-up CMOS RAM, a RAM 14, input/output interfaces 15, 17, an MDI (manual data input) 16 with a display apparatus (CRT, LCD and so on), servo amplifiers 19, 20, 21 of the X axis, Y axis, and Z axis of a machining feed shaft are connected to the processor 11 via a bus 23.

A system program to control the whole laser beam machine 30 is stored in the ROM 12. A machining program created by using the MDI 16 with a display apparatus or a machining program input via an input interface (not shown) is stored in the nonvolatile memory 13. The RAM 14 is used for temporary storage of data while various kinds of processing are performed. A laser oscillator 40 is connected to the input/output interface 15 and an output control signal from the processor 11 is sent to the laser oscillator 40 via the input/output interface 15. The laser oscillator 40 emits a laser beam 41 according to the output control signal and the laser beam 41 is reflected by a bending mirror 42, sent to a machining head 35, and condensed by the machining head 35 so that the workpiece 39 is irradiated with the laser beam 41 from the tip of the nozzle 36 attached to the machining head 35.

A sensor 37 to measure the gap amount between the tip of the nozzle 36 and the workpiece 39 is provided in the machining head 35 and an output signal of the sensor 37 is read as a gap amount via an A/D converter (converter that concerts an analog signal into a digital signal) 18 or the input/output interface 17 of the numerical controller 10.

A laser beam machine mechanism unit 34 includes an X axis servo motor 31 that drives a table 38 on which the workpiece 39 is mounted in an X axis direction (left and right direction in FIG. 1), a Y axis servo motor 32 that drives the table 38 in a Y axis direction (direction perpendicular to the drawing sheet of FIG. 1), and a Z axis servo motor 33 that drives the machining head 35 and the nozzle 36 in a Z axis direction perpendicular to the X axis and the Y axis. The X axis servo motor 31, the Y axis servo motor 32, and the Z axis servo motor 33 are connected to the X axis servo amplifier 19, the Y axis servo amplifier 20, and the Z axis servo amplifier 21, respectively.

The hardware configuration of the laser beam machine described above is publicly known as a laser beam machine that carries out so-called tracer control that machines a predetermined workpiece shape by relatively moving the machining head 35 with respect to the workpiece 39 according to commands while carrying out control so that the gap amount between the nozzle 36 and the workpiece 39 is a predetermined value.

A PMC (programmable machine controller) 22 is connected to the numerical controller 10 and controls the laser beam machine 30 and the like based on a sequence program. The PMC 22 converts a content commanded by a machining program into a signal needed by the sequence program and outputs the signal to a machine tool side and also receives various signals from the machine tool side, performs needed processing thereon, and delivers the signals to the processor 11.

Figure 2:
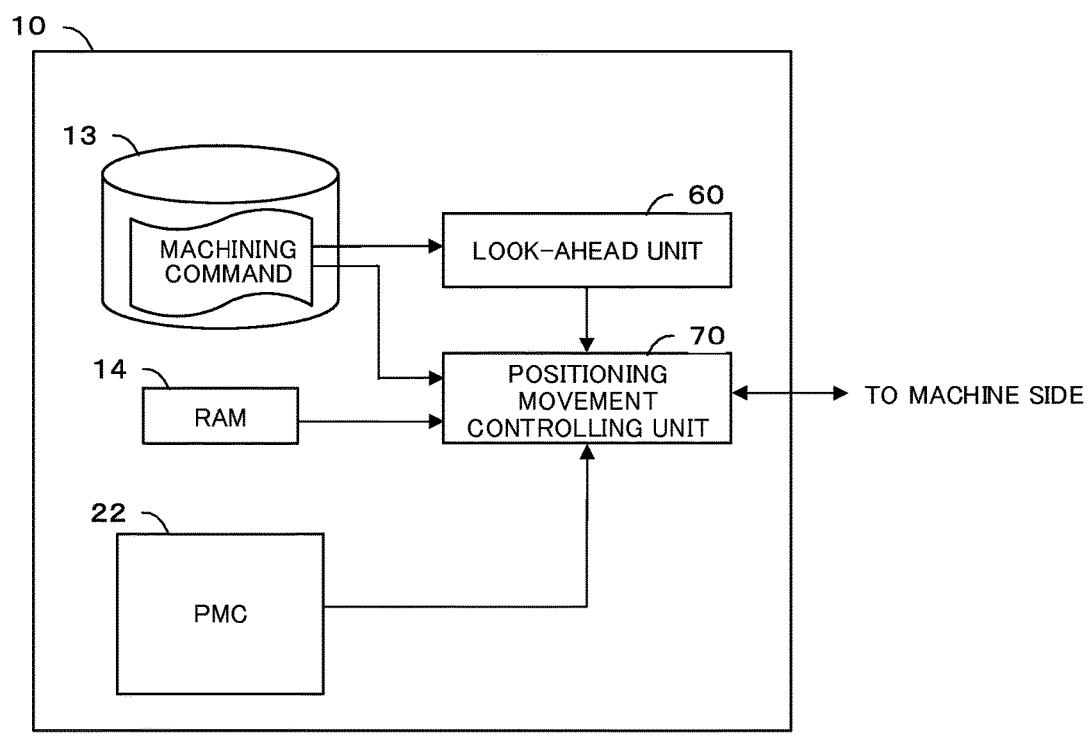
FIG. 2 is a function block diagram showing a positioning function of the numerical controller in FIG. 1.

FIG. 2 is a function block diagram showing a positioning function of the numerical controller 10 in FIG. 1.

The numerical controller 10 includes a look-ahead unit 60 and a positioning movement controlling unit 70. The look-ahead unit 60 looks ahead to the next block from the machining program stored in the nonvolatile memory 13 during positioning operation. The positioning movement controlling unit 70 controls, when the positioning operation is controlled based on the block read from the machining program, the movement of the nozzle 36 of the laser beam machine 30 based on the type of command specified by the block that was looked ahead to by the look-ahead unit 60, information about control conditions of the laser beam machine 30 read from the RAM 14 or the like, and a signal state of the PMC 22.

Hereinafter, each form of positioning operation control of the nozzle 36 by the numerical controller 10 that has the hardware configuration shown in FIG. 1 and the function shown in FIG. 2 is explained below.

First, a first form of positioning operation control of the nozzle by the numerical controller will be described using FIGS. 3 and 4.

Figure 3:
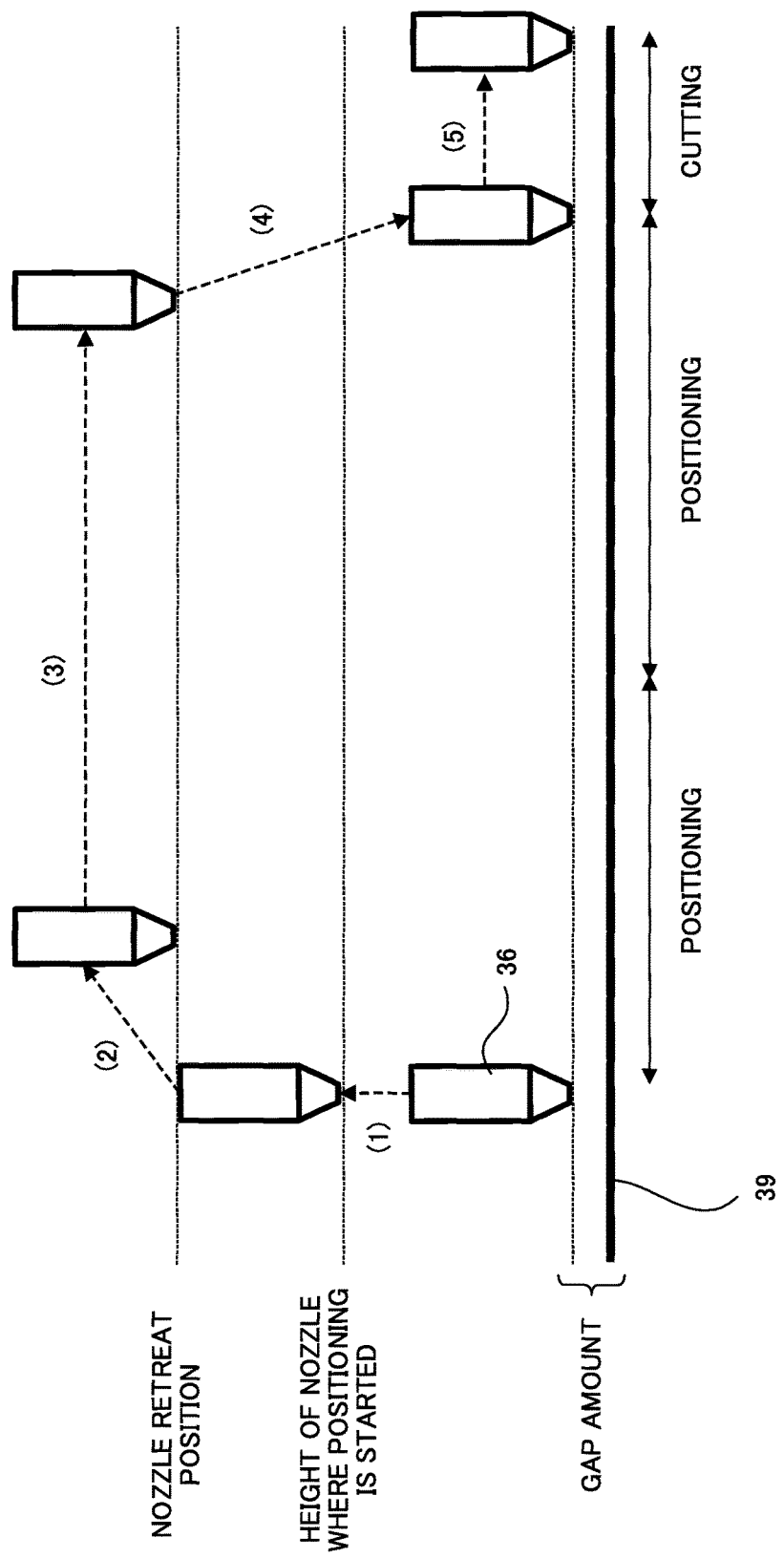
FIG. 3 is a diagram illustrating a first embodiment of positioning operation control of a nozzle by the numerical controller in FIG. 1.

FIG. 3 shows an example of basic movement of the nozzle 36 during positioning operation control by the numerical controller 10 when positioning commands extend over a plurality of consecutive blocks.

When processing of one block that performs laser beam machining accompanied by gap control ends, the numerical controller 10 reads a positioning command in the next block from the machining program stored in the nonvolatile memory 13 and (1) causes the nozzle 36 to retreat in a direction away from the workpiece 39. Then, when the nozzle 36 reaches a certain height, the numerical controller 10 (2) starts the movement of the contouring control axis of the nozzle 36. When the movement of the contouring control axis of the nozzle 36 is started, the numerical controller 10 looks ahead to the next block from the machining program stored in the nonvolatile memory 13 and if the block looked ahead to is a positioning command, (3) continues to perform the positioning operation commanded by the block without causing the nozzle 36 to return to the surface of the workpiece 39. Subsequently, while the block looked ahead to is a positioning command, the numerical controller 10 repeats the same operation. Then, when a block commanding laser beam machining or the like on the workpiece 39 is looked ahead to, the numerical controller 10 (4) causes the nozzle 36 to return to the surface of the workpiece 39 just when the current positioning end point is reached and (5) continues machining.

Movement control processing performed by the processor 11 (the positioning movement controlling unit 70, the look-ahead unit 60) of the numerical controller 10 when the movement of the nozzle 36 is controlled in a pattern as shown in FIG. 3 will be described using the flow chart in FIG. 4.

When the next block is read from the machining program stored in the nonvolatile memory 13, if the read block is a positioning command, the positioning movement controlling unit 70 determines whether gap control of the nozzle 36 is currently carried out or not by referring to a signal memory recording control conditions of the laser beam machine provided in the RAM 14 (step S401). If the gap control is not carried out, movement control of the contouring control axis of the nozzle 36 is carried out, and when the nozzle 36 reaches the destination specified by the positioning command, the positioning movement controlling unit 70 terminates the positioning operation control in the block being executed (step S402). On the other hand, if it is determined in step S401 that the gap control of the nozzle 36 is carried out, the positioning movement controlling unit 70 further determines whether the nozzle 36 has retreated or not (step S403). If the nozzle 36 has not yet retreated, the positioning movement controlling unit 70 determines that it is necessary for the nozzle 36 to retreat and starts retreat control of the nozzle 36 (step S404). Then, when the nozzle 36 retreats by a certain height from the surface of the workpiece 39 (step S405), the positioning movement controlling unit 70 starts movement control of the contouring control axis of the nozzle 36 (step S406).

Then, the look-ahead unit 60 looks ahead to the next block of the block currently being executed (step S407). The positioning movement controlling unit 70 determines whether the command specified by the block looked ahead to by the look-ahead unit 60 is a positioning command or not (step S408). If the command specified by the block looked ahead to by the look-ahead unit 60 is not a positioning command, the positioning movement controlling unit 70 determines that it is necessary to cause the nozzle 36 to return to the surface of the workpiece 39 and carries out control to cause the nozzle 36 to return to the surface of the workpiece 39 just when the contouring control axis of the nozzle 36 reaches the positioning end point (step S409). On the other hand, if it is determined in step S408 that the block looked ahead to by the look-ahead unit 60 is a positioning command, the positioning movement controlling unit 70 terminates positioning operation control processing in the block being executed without causing the nozzle 36 to return to the surface of the workpiece 39 when the contouring control axis of the nozzle 36 reaches the positioning end point.

Figure 4:
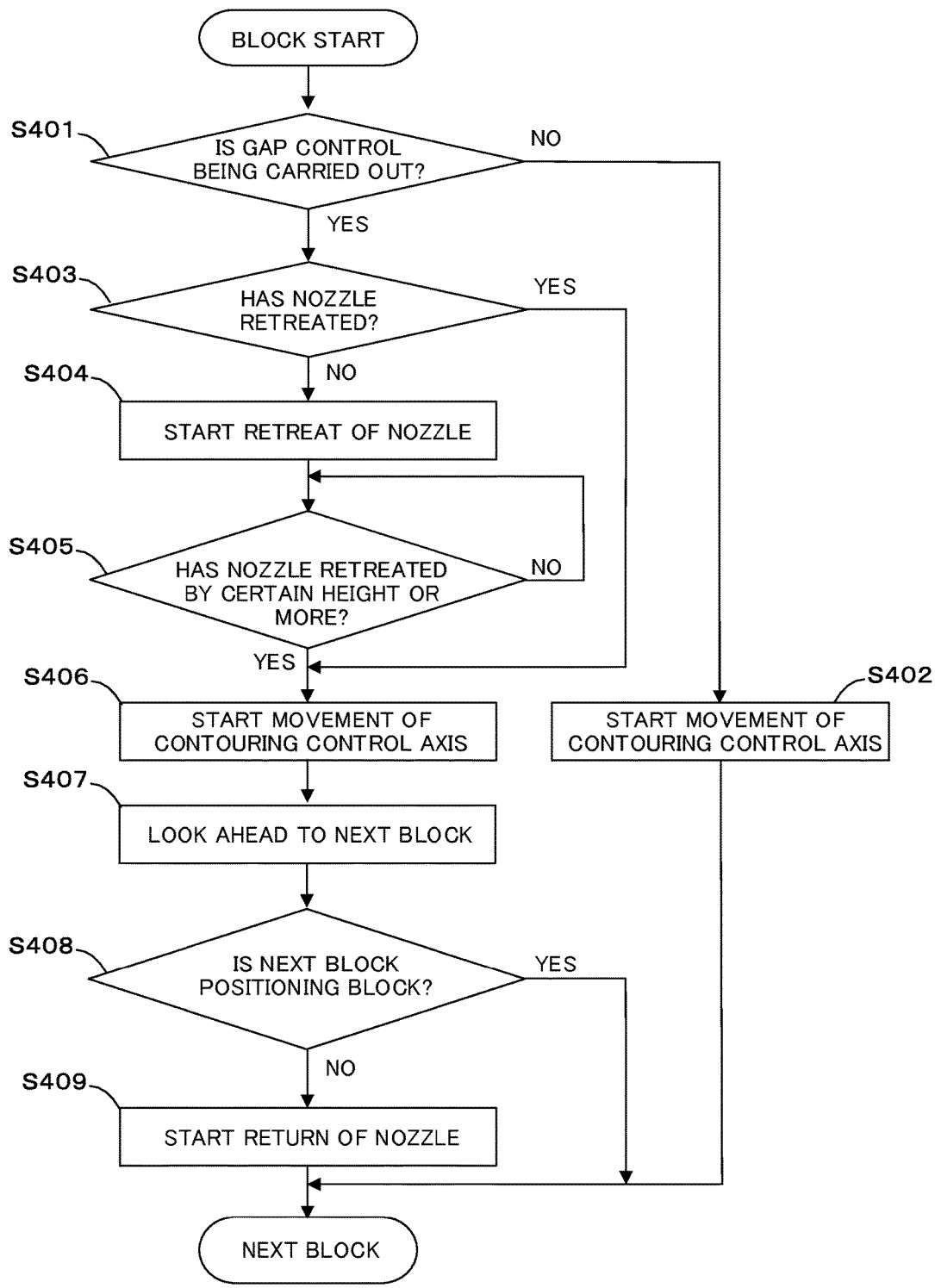
FIG. 4 is a flow chart illustrating movement control processing performed by a processor of the numerical controller in FIG. 1 when the positioning operation of the nozzle is controlled in a form shown in FIG. 3.

Therefore, according to the positioning operation control in the present embodiment, in a case where positioning commands are successively issued, if positioning operation control is continued without causing the nozzle 36 to return under the positioning operation control of the nozzle as shown in FIGS. 3 and 4, it is possible to reduce the time in which the movement of the contouring control axis of the nozzle 36 is kept waiting when positioning is started, thereby shortening the overall machining time.

Next, a second embodiment of the positioning operation control of the nozzle by the numerical controller will be described using FIGS. 5 and 6.

While the above first embodiment of the positioning operation control of the nozzle has been described as being applied when positioning commands extend over a plurality of consecutive blocks, the second embodiment of the positioning operation control of the nozzle is applied when the next command looked ahead to during positioning operation is, instead of a positioning command, a command not accompanied by laser beam machining.

Figure 5:
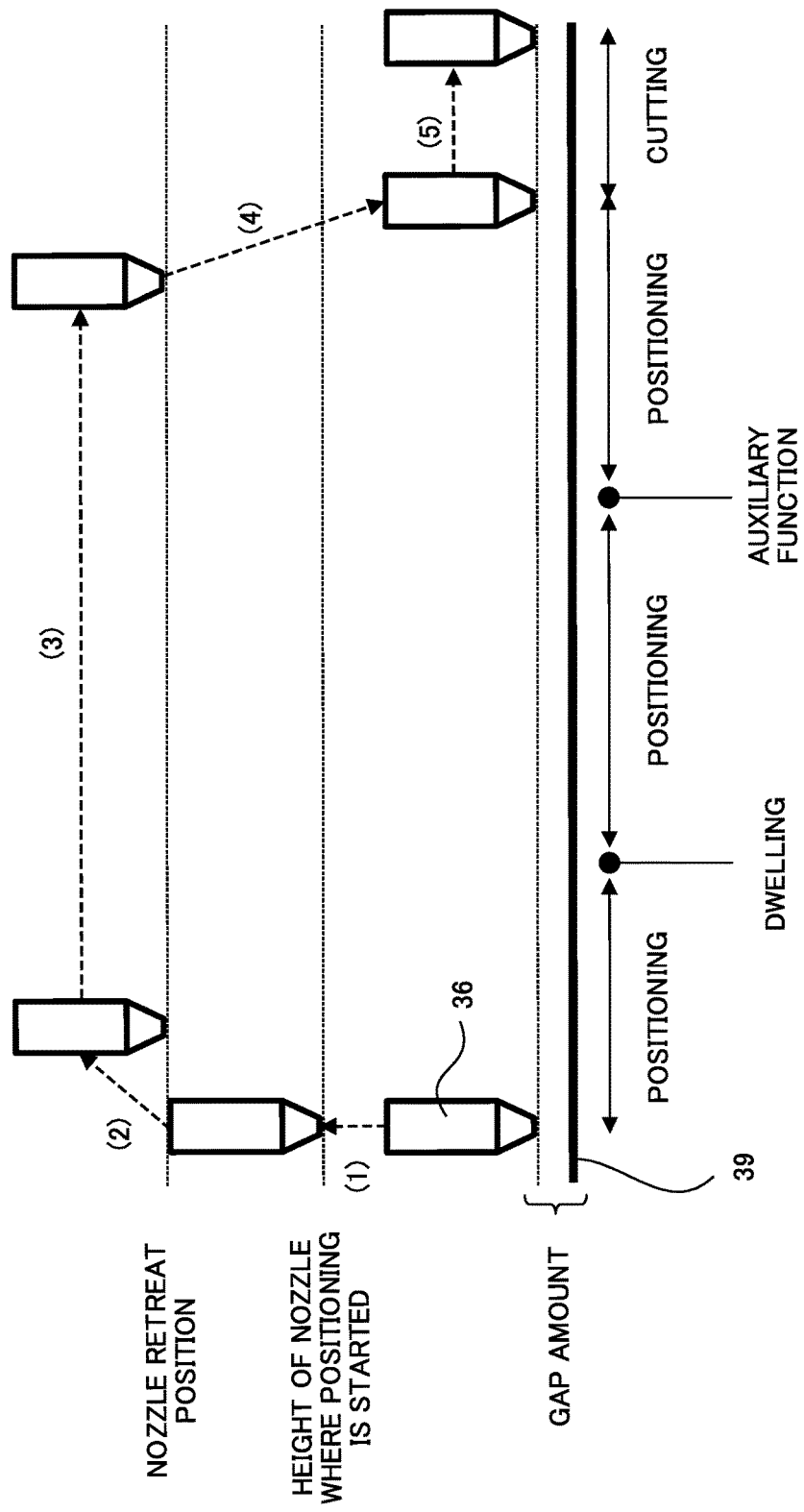
FIG. 5 is a diagram illustrating a second embodiment of the positioning operation control of the nozzle by the numerical controller in FIG. 1.
Figure 6:
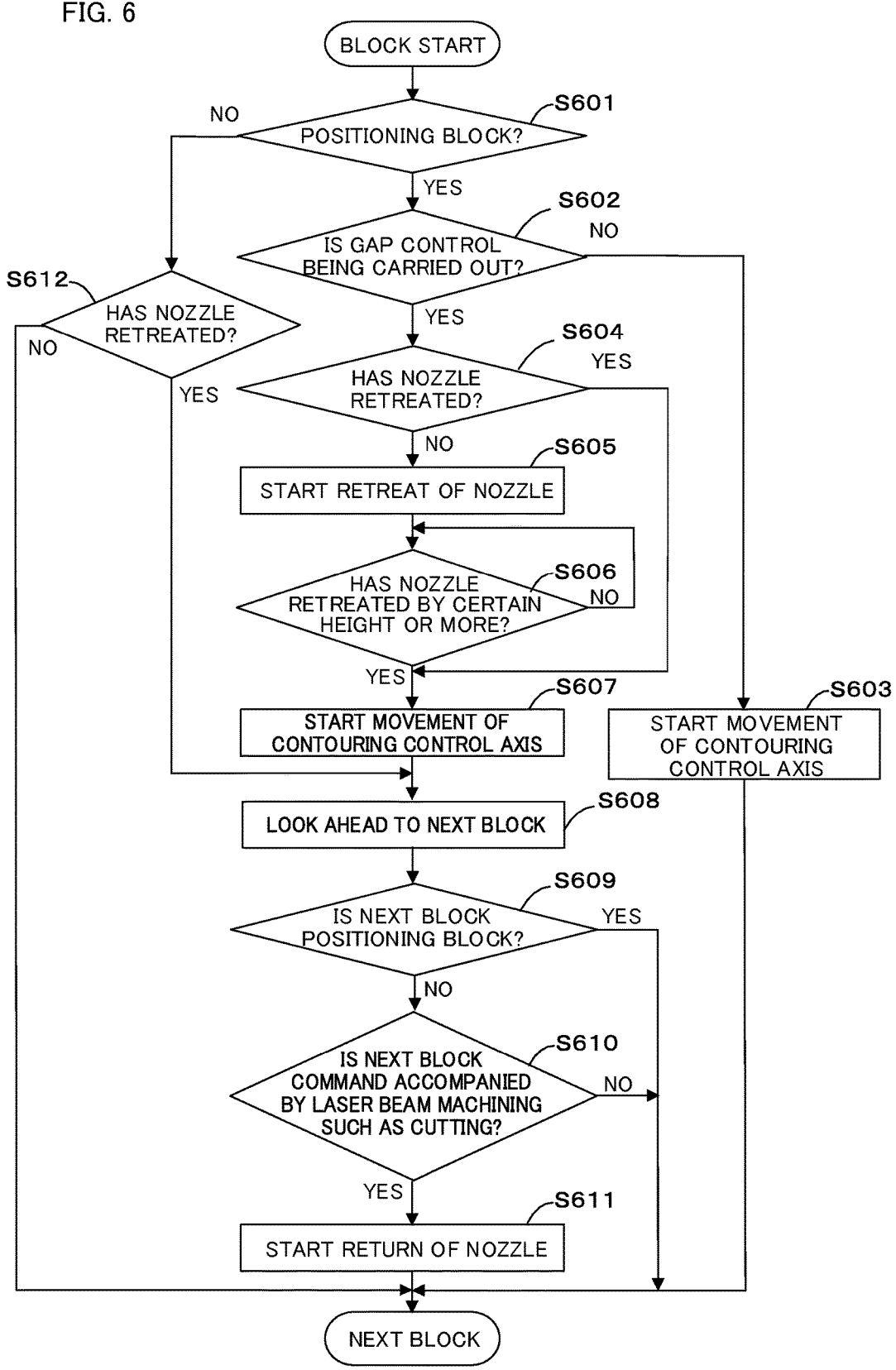
FIG. 6 is a flow chart illustrating the movement control processing performed by the processor of the numerical controller in FIG. 1 when the positioning operation of the nozzle is controlled in a form shown in FIG. 5.

FIG. 5 is a diagram showing an example of the movement of the nozzle 36 during positioning operation control by the numerical controller 10 when the next command looked ahead to during positioning operation is a command not accompanied by laser beam machining.

When processing of a block that performs laser beam machining accompanied by gap control ends, the numerical controller 10 reads a positioning command in the next block from the machining program stored in the nonvolatile memory 13 and (1) causes the nozzle 36 to retreat in a direction away from the workpiece 39. Then, when the nozzle 36 reaches a certain height, the numerical controller 10 (2) starts the movement of the contouring control axis of the nozzle 36. When the movement of the contouring control axis of the nozzle 36 is started, the numerical controller 10 looks ahead to the next block from the machining program stored in the nonvolatile memory 13 and if the block looked ahead to is a positioning command or a command not accompanied by laser beam machining such as dwelling or a simple auxiliary function, (3) continues to perform the positioning operation by retaining the nozzle 36 in retreat without causing the nozzle 36 to return to the surface of the workpiece 39 even if the positioning operation currently being performed ends. Then, while the block looked ahead to is a positioning command or a command not accompanied by laser beam machining, the same operation is repeated. Then, when a command that performs laser beam machining on the workpiece 39 is looked ahead to, the numerical controller 10 (4) causes the nozzle 36 to return to the surface of the workpiece 39 just when the current positioning end point is reached and (5) continues machining.

The movement control processing performed by the processor 11 (the positioning movement controlling unit 70, the look-ahead unit 60) of the numerical controller 10 when the movement of the nozzle 36 is controlled in a pattern as shown in FIG. 5 will be described using the flow chart in FIG. 6.

When the next block is read from the machining program stored in the nonvolatile memory 13, the positioning movement controlling unit 70 determines whether the command specified by the read block is a positioning command or not (step S601) and if the command is a positioning command, determines whether gap control of the nozzle 36 is currently carried out or not (step S602). If the gap control is not carried out, the positioning movement controlling unit 70 moves the contouring control axis of the nozzle 36 and when the nozzle 36 reaches the destination specified by the positioning command, terminates the positioning operation control of the block being executed (step S603). On the other hand, if it is determined in step S602 that the gap control of the nozzle 36 is carried out, the positioning movement controlling unit 70 further determines whether the nozzle 36 has retreated or not (step S604). If the nozzle 36 has not yet retreated, the positioning movement controlling unit 70 determines that it is necessary for the nozzle 36 to retreat and starts the retreat control of the nozzle 36 (step S605). Then, when the nozzle 36 retreats by a certain height from the surface of the workpiece 39 (step S606), the positioning movement controlling unit 70 starts the movement control of the contouring control axis of the nozzle 36 (step S607).

Then, the look-ahead unit 60 looks ahead to the next block of the block currently being executed (step S608). The positioning movement controlling unit 70 determines whether the command specified by the block looked ahead to by the look-ahead unit 60 is a positioning command or not (step S609). If the command specified by the block looked ahead to by the look-ahead unit 60 is not a positioning command, the positioning movement controlling unit 70 further determines whether or not the command specified by the block looked ahead to is a command accompanied by laser beam machining such as cutting (step S610). If the command is a command accompanied by laser beam machining such as cutting, the positioning movement controlling unit 70 determines that it is necessary to cause the nozzle 36 to return to the surface of the workpiece 39 and carries out control such that the nozzle 36 is caused to return to the surface of the workpiece 39 just when the contouring control axis of the nozzle 36 reaches the positioning end point (step S611). On the other hand, if it is determined in step S609 that the command specified by the block looked ahead to in step S608 is a positioning command or a command not accompanied by laser beam machining such as dwelling or a simple auxiliary function, the positioning movement controlling unit 70 terminates the positioning operation control processing in the block being executed without causing the nozzle 36 to return to the surface of the workpiece 39 when the contouring control axis of the nozzle 36 reaches the positioning end point.

If it is determined in step S601 that the command specified by the read block is not a positioning command, the positioning movement controlling unit 70 further determines whether the nozzle 36 has retreated or not (step S612) and if the nozzle 36 has retreated, proceeds to the processing to look ahead to the next block and if the nozzle 36 has not yet retreated, terminates the positioning operation control processing in the block being executed.

Therefore, according to the positioning operation control in the present embodiment, in a case where positioning commands are successively issued or commands not accompanied by laser beam machining are successively issued, if positioning operation control is continued without causing the nozzle 36 to return, it is possible to reduce the time in which the movement of the contouring control axis of the nozzle 36 is kept waiting when positioning is started, thereby shortening the overall machining time.

Next, a third embodiment of the positioning operation control of the nozzle by the numerical controller will be described using FIGS. 7 and 8.

While the above second embodiment of the positioning operation control of the nozzle has been described as being applied when positioning commands or commands not accompanied by laser beam machining extend over a plurality of consecutive blocks, the third embodiment of the positioning operation control of the nozzle is applied when a nozzle return signal is output from the PMC 22 during positioning operation.

Figure 7:
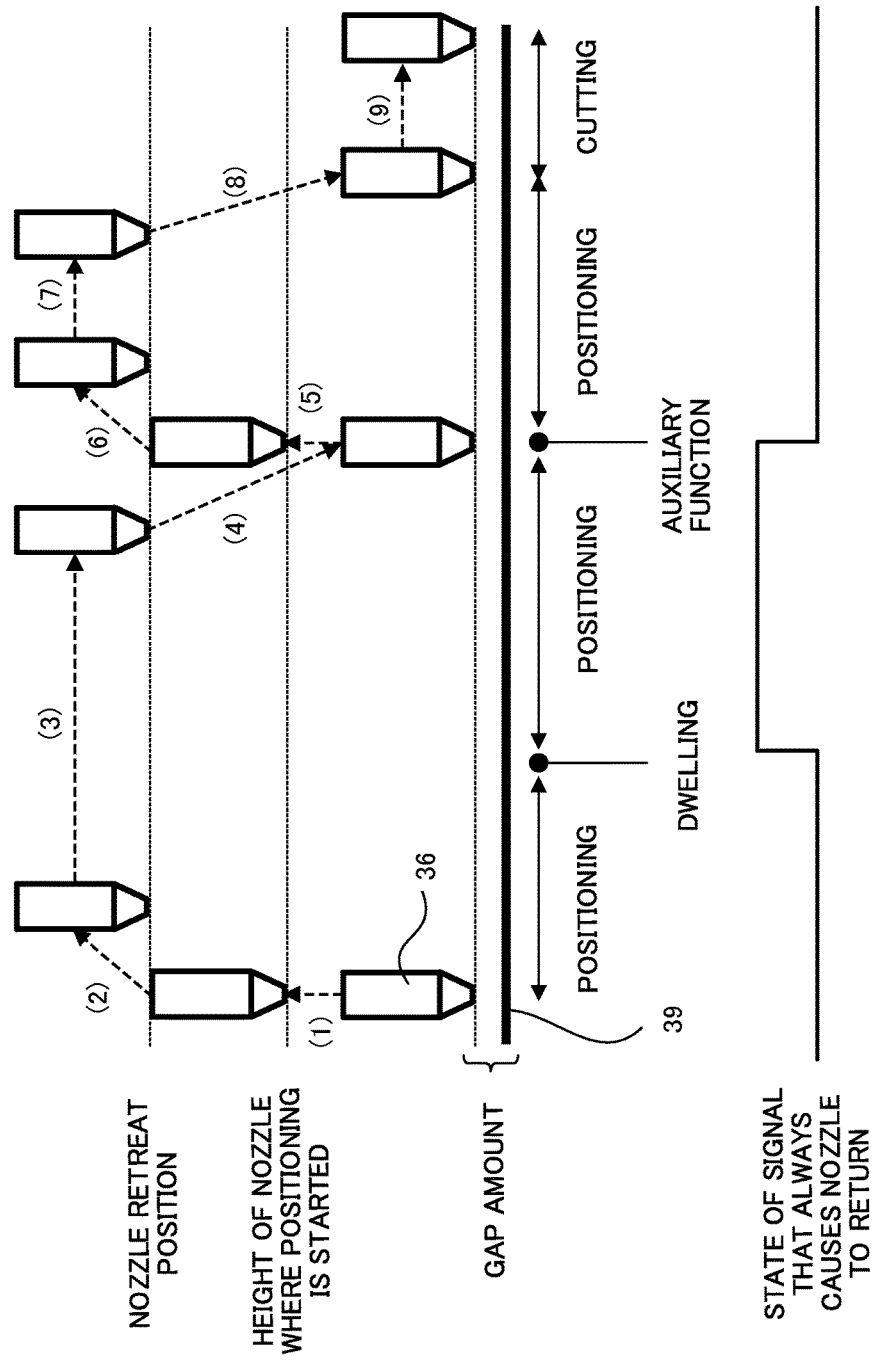
FIG. 7 is a diagram illustrating a third embodiment of the positioning operation control of the nozzle by the numerical controller in FIG. 1.
Figure 8:
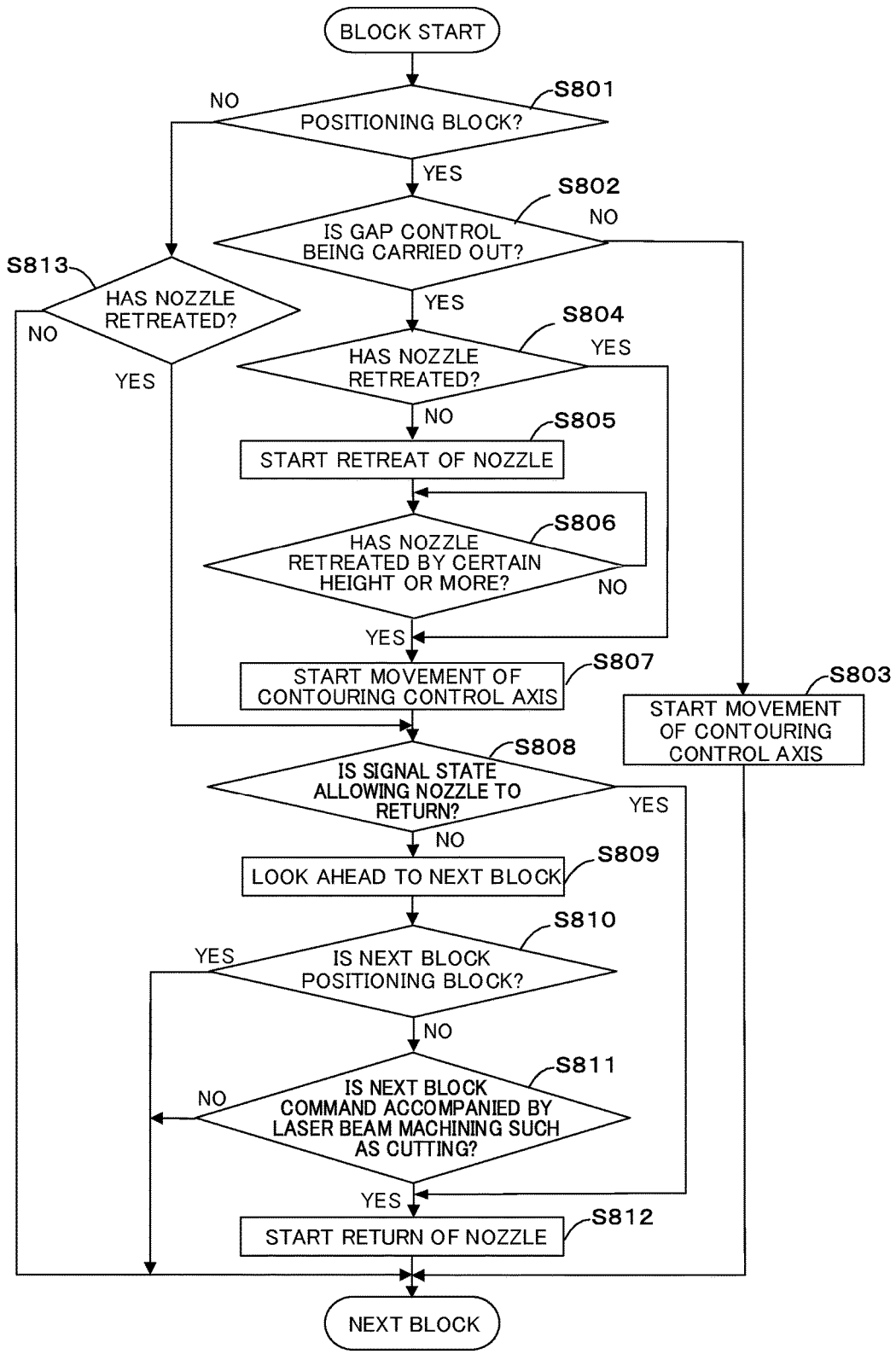
FIG. 8 is a flow chart illustrating the movement control processing performed by the processor of the numerical controller in FIG. 1 when the positioning operation of the nozzle is controlled in a form shown in FIG. 7.

FIG. 7 is a diagram showing an example of the movement of the nozzle 36 during positioning operation control by the numerical controller 10.

In (1) to (3) in FIG. 7, the positioning operation control similar to that in (1) to (3) in FIG. 5 is carried out. Then, when the output of a nozzle return signal from the PMC 22 is detected during positioning operation control, the numerical controller 10 (4) causes the nozzle 36 to return to the surface of the workpiece 39 just when the current positioning end point is reached. The movement of the nozzle 36 thereafter is the same as that of the nozzle 36 described in the other embodiments.

The movement control processing performed by the processor 11 (the positioning movement controlling unit 70, the look-ahead unit 60) of the numerical controller 10 when the movement of the nozzle 36 is controlled in a pattern as shown in FIG. 7 will be described using the flow chart in FIG. 8.

When the next block is read from the machining program stored in the nonvolatile memory 13, the positioning movement controlling unit 70 determines whether the command specified by the read block is a positioning command or not (step S801) and if the command is a positioning command, determines whether gap control of the nozzle 36 is currently carried out or not (step S802). If the gap control is not carried out, the positioning movement controlling unit 70 moves the contouring control axis of the nozzle 36 (step S803) and when the nozzle 36 reaches the destination specified by the positioning command, terminates the positioning operation control of the block being executed. On the other hand, if it is determined in step S802 that the gap control of the nozzle 36 is carried out, the positioning movement controlling unit 70 further determines whether the nozzle 36 has retreated or not (step S804). If the nozzle 36 has not yet retreated, the positioning movement controlling unit 70 determines that it is necessary for the nozzle 36 to retreat and starts the retreat control of the nozzle 36 (step S805). Then, when the nozzle 36 retreats by a certain height from the surface of the workpiece 39 (step S806), the positioning movement controlling unit 70 starts the movement control of the contouring control axis of the nozzle 36 (step S807).

When the movement control of the contouring control axis of the nozzle 36 is started, the positioning movement controlling unit 70 determines whether or not the PMC 22 has output a nozzle return signal (step S808) and if the nozzle return signal is detected, the positioning movement controlling unit 70 determines that it is necessary to cause the nozzle 36 to return to the surface of the workpiece 39 and carries out control such that the nozzle 36 is caused to return to the surface of the workpiece 39 just when the contouring control axis of the nozzle 36 reaches the positioning end point (step S812). On the other hand, if it is determined in step S808 that no nozzle return signal is detected, the look-ahead unit 60 looks ahead to the next block of the block currently being executed (step S809). The subsequent operation (step S810 to step S812) is the same as that in the other embodiment described above and thus, the description thereof is omitted.

Therefore, according to the positioning operation control in the present embodiment, even if positioning commands or commands not accompanied by laser beam machining are successively issued, the nozzle 36 can forcibly be caused to return to the surface of the workpiece 39 depending on a signal state of the PMC 22.

The invention claimed is:

1. A numerical controller of a laser beam machine, comprising:

a storage unit that stores a machining program, wherein blocks constituting the machining program are sequentially read from the machining program stored in the storage unit, an operation of a nozzle of the laser beam machine is controlled based on a command specified by the read block, and retreat control of the nozzle from a workpiece surface or return control thereof to the workpiece surface is automatically carried out by a positioning command specified by the block during gap control of the nozzle, the numerical controller further comprising:

a look-ahead unit that looks ahead to a next block of the block currently being executed from the machining program during positioning operation control of the nozzle; and a positioning movement controlling unit that controls the movement of the nozzle based on a type of the command specified by the next block looked ahead to by the look-ahead unit, wherein the positioning movement controlling unit continues movement control of a contouring control axis while retaining the nozzle in retreat when the next block is the positioning command, and carries out the return control of the nozzle to the workpiece surface when the next block is other than the positioning command, and the positioning movement controlling unit continues the movement control of the contouring control axis while retaining the nozzle in retreat when the next block is not the positioning command and the next block is not accompanied by laser beam machining.

2. The numerical controller according to claim 1, wherein the positioning movement controlling unit carries out the return control of the nozzle to the workpiece surface based on a state of a signal output from a programmable machine controller controlling the laser beam machine regardless of a type of the command specified by the next block.

* * * * *